United States Patent
Assa et al.

(10) Patent No.: US 8,938,213 B1
(45) Date of Patent: Jan. 20, 2015

(54) SYSTEM, METHOD, AND COMPUTER PROGRAM FOR PROCESSING A CHARGE FOR A TELECOMMUNICATION BASED ON BILLING GROUPS OF PARTIES TO THE TELECOMMUNICATION

(75) Inventors: Jackie Assa, Tel Aviv (IL); Nir Levy, Tel Aviv (IL)

(73) Assignee: Amdocs Software Systems Limited, Dublin (IE)

( * ) Notice: Subject to any disclaimer, the term of this patent is extended or adjusted under 35 U.S.C. 154(b) by 309 days.

(21) Appl. No.: 13/048,813

(22) Filed: Mar. 15, 2011

Related U.S. Application Data

(60) Provisional application No. 61/417,204, filed on Nov. 24, 2010.

(51) Int. Cl.
*H04W 4/24* (2009.01)

(52) U.S. Cl.
USPC ........ 455/406; 455/418; 455/420; 455/422.1; 455/436; 455/552.1; 379/114.26; 379/114.28

(58) Field of Classification Search
CPC ........................................................ H04W 4/24
USPC ...................... 455/405–409, 418–419, 432.1, 455/436–437
See application file for complete search history.

(56) References Cited

U.S. PATENT DOCUMENTS

| | | | |
|---|---|---|---|
| 8,290,471 B1 * | 10/2012 | Jones et al. .................... | 455/406 |
| 8,606,223 B1 * | 12/2013 | Lekutai et al. ................. | 455/406 |
| 2003/0114142 A1 * | 6/2003 | Brown et al. .................. | 455/408 |
| 2009/0318113 A1 * | 12/2009 | Waller ........................... | 455/407 |

* cited by examiner

*Primary Examiner* — Babar Sarwar
(74) *Attorney, Agent, or Firm* — Zilka-Kotab, PC

(57) ABSTRACT

A system, method, and computer program product are provided for processing a charge for a telecommunication. In use, a telecommunication from a service subscriber to a recipient is received. Additionally, it is determined whether both the service subscriber and the recipient are included within one or more billing groups. Further, a charge for the telecommunication is processed, based on the determining.

19 Claims, 5 Drawing Sheets

SYSTEM, METHOD, AND COMPUTER PROGRAM FOR PROCESSING A CHARGE FOR A TELECOMMUNICATION BASED ON BILLING GROUPS OF PARTIES TO THE TELECOMMUNICATION

CLAIM OF PRIORITY

This application claims the benefit of U.S. Provisional Patent Application 61/417,204, entitled "Social Billing: A Payment method utilizing user social interactions," by Assa et al., filed Nov. 24, 2010, the entire contents of which are incorporated herein by reference.

THE INVENTION

The present invention relates to providing telecommunication services to a plurality of users, and more particularly to processing charges for such telecommunication services.

BACKGROUND

Despite recent increases in Internet-based social network activity, the largest active social network remains telecommunications-based. For example, on a daily basis, numerous individuals communicate with their friends and businesses utilizing telephone-based communication medium. Unfortunately, conventional methods of organizing and implementing charging and payment systems for these telecommunications have exhibited various limitations.

For example, in many cases today, telecommunication services are paid to the service provider by the telecommunication consumer. However, under present billing schemes, the entity that benefits from the consumption of the communication resources is often times not responsible for the payment associated with such consumption. There is thus a need for addressing these and/or other issues associated with the prior art.

SUMMARY

A system, method, and computer program product are provided for processing a charge for a telecommunication. In use, a telecommunication from a service subscriber to a recipient is received. Additionally, it is determined whether both the service subscriber and the recipient are included within one or more billing groups. Further, a charge for the telecommunication is processed, based on the determining.

DETAILED DESCRIPTION

Figure 1:
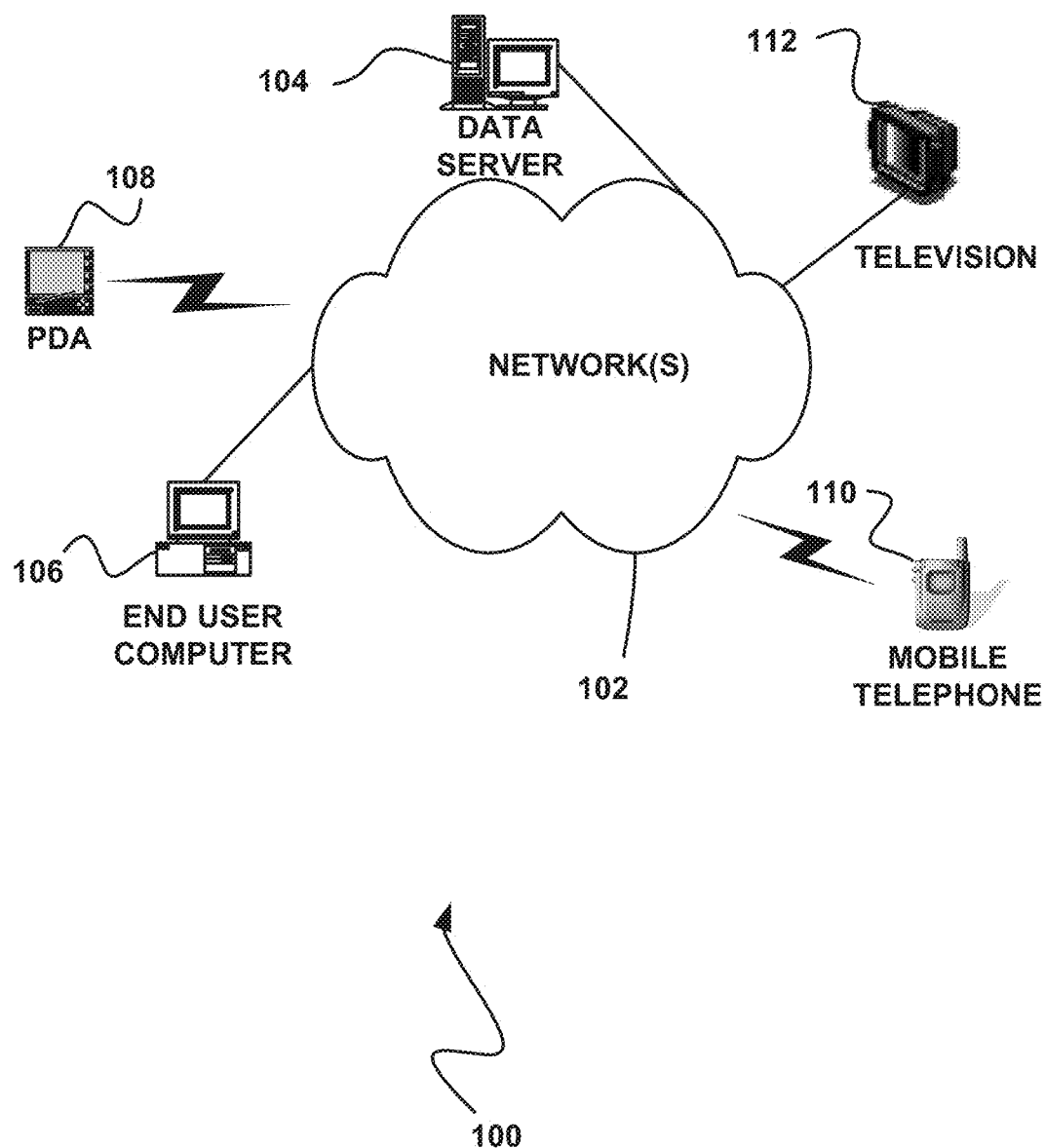
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
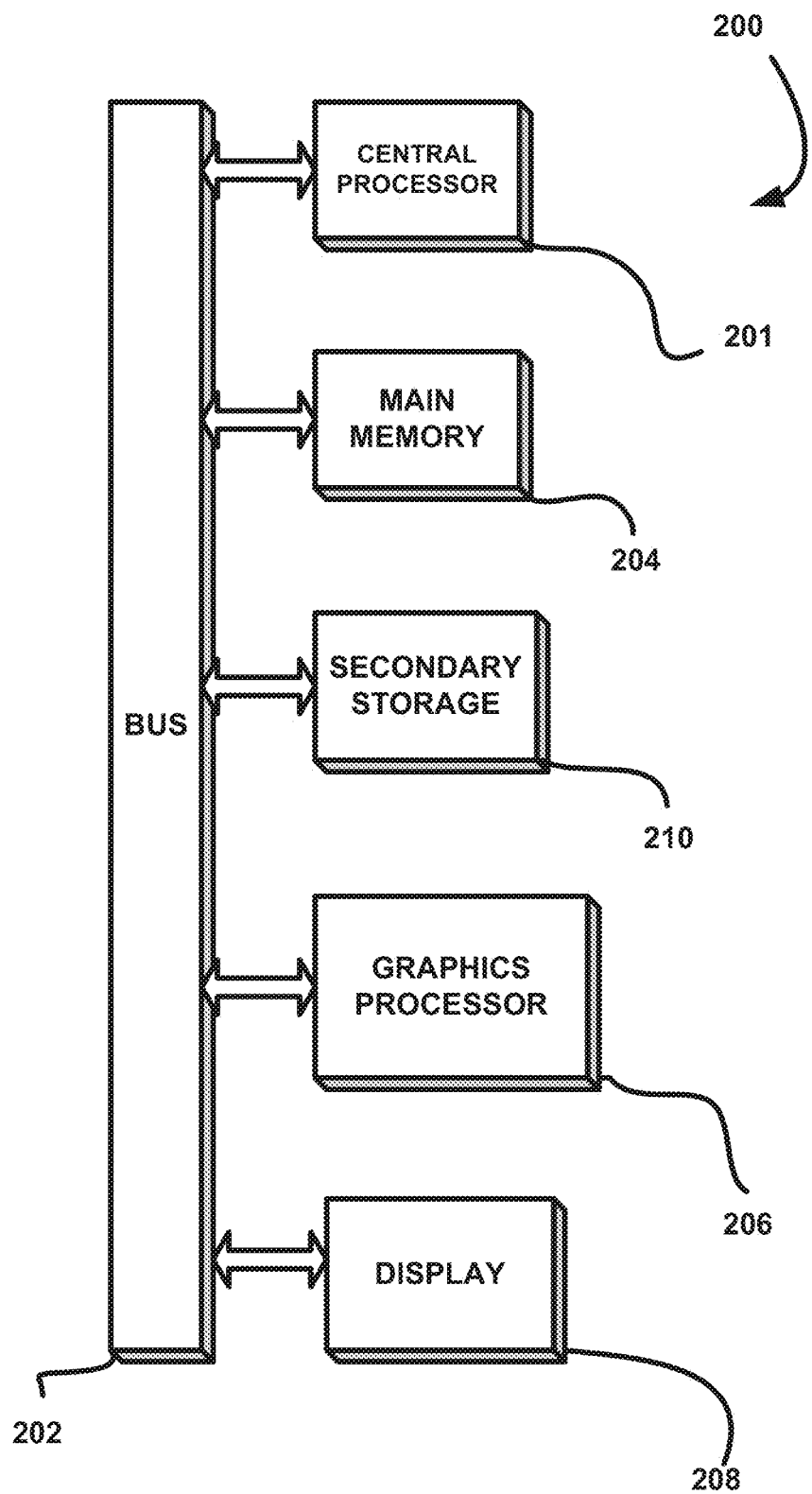
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
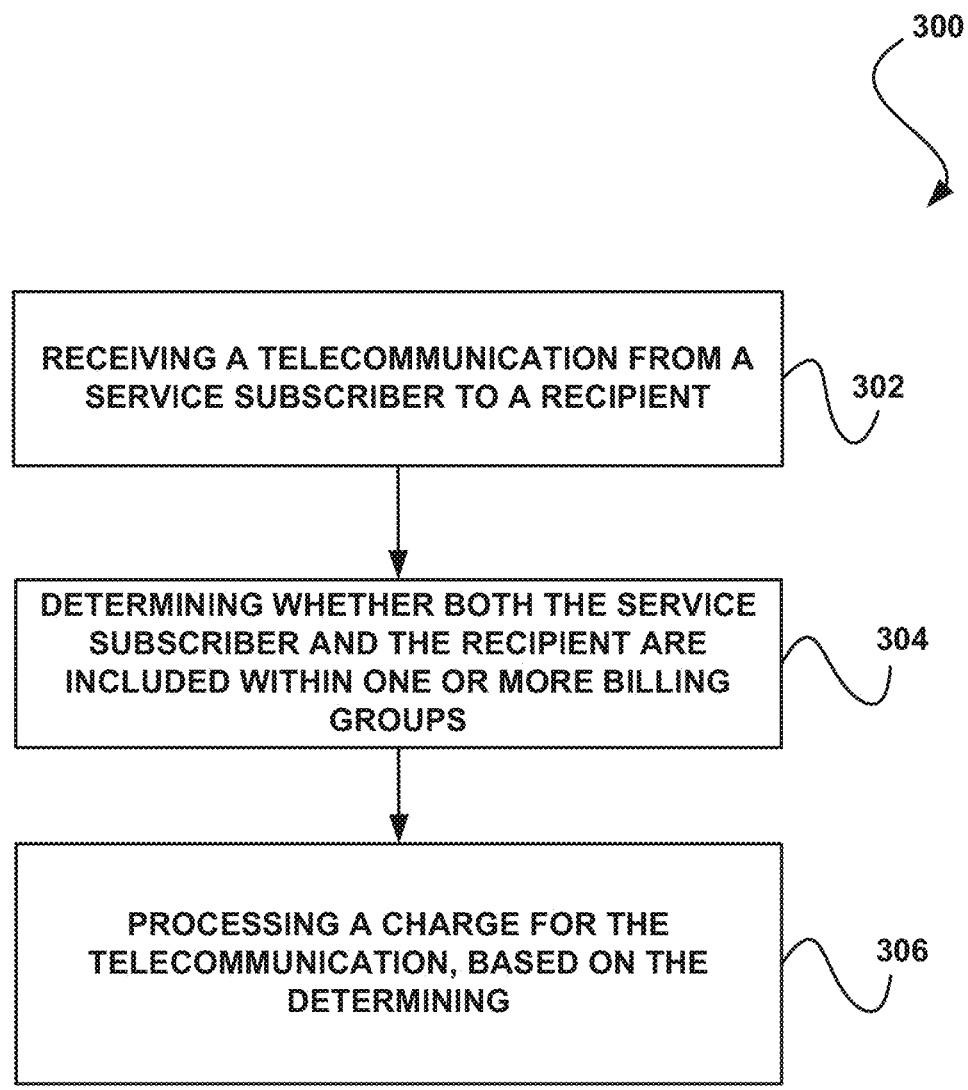
FIG. 3 illustrates a method for processing a charge for a telecommunication, in accordance with one embodiment.

FIG. 3 illustrates a method 300 for processing a charge for a telecommunication, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a telecommunication from a service subscriber to a recipient is received. In one embodiment, the telecommunication may include a telephone call. For example, the telecommunication may include a cellular telephone call, a wired telephone call, an internet protocol (IP) telephone call, etc. In another embodiment, the telecommunication may include a data transmission. For example, the telecommunication may include a short message service (SMS) message, a multimedia messaging service (MMS) message, an electronic mail message, etc.

In yet another embodiment, the telecommunication may be made from a mobile device. For example, the telecommunication may be made from a cellular telephone, a personal digital assistant, a laptop computer, etc. Of course, however, the telecommunication may be made from any type of device (e.g., a wired telephone, a desktop computer, etc.). In still another embodiment, the telecommunication may be received at a service provider (e.g., an operator, a telephone service provider, a data transmission service provider, etc.).

Additionally, in one embodiment, the service subscriber and recipient may each be associated with a particular service provider. For example, the service subscriber may have registered their telecommunication device with a particular service provider, and the recipient may have registered their telecommunication device with the same service provider or a different service provider than the service subscriber.

Further, as shown in operation 304, it is determined whether both the service subscriber and the recipient are included within one or more billing groups. In one embodiment, a billing group may include a plurality of service subscribers organized as a group for purposes of billing. In another embodiment, each member of the billing group may share a common attribute. For example, the billing group may include a group of subscribers with shared interests (e.g., a fan dub, a shopping member club, an alumni association, etc.). In another example, the billing group may be business oriented (e.g., may include members of a trade union, members of a school class, participants in a conference, etc.).

Further still, in another embodiment, at least one of the service subscriber and the recipient may be included within a plurality of billing groups simultaneously. For example, the service subscriber may be a member of both a particular fan club billing group as well as a particular employer billing group. In yet another embodiment, an identification of each of the billing groups, as well as an identification of the members of each of the billing groups, may be stored within a database.

Further still, as shown in operation 306, a charge for the telecommunication is processed, based on the determining. In one embodiment, the charge for the communication may include a monetary fee (e.g., a time-based fee, a data-based fee, a bandwidth-based fee, etc.). In another embodiment, the charge for the communication may include one or more credits (e.g., one or more pre-paid service credits, etc.).

Also, in one embodiment, if the service subscriber and the recipient are not included in a billing group, a pricing plan associated with the service subscriber may be used to process the charge. For example, the service subscriber may have negotiated a non-group rate plan, and will be charged under that rate plan. In another example, the service subscriber may have purchased pre-paid telecommunication credits, and the charge for the telecommunication may be deducted from the pre-paid credits.

In another embodiment, if the service subscriber and the recipient are both included in a single billing group, a pricing plan associated with the billing group may be used to process the charge. In another embodiment, the pricing plan may dictate the entities responsible for the charge for the telecommunication, based on one or more criteria. For example, if the service subscriber is a teacher of a school class group and the recipient is a student of the class group, then the class group pricing plan may dictate that members of a parent teacher association (PTA) associated with the class group may share the charge for the communication. In this way, the PTA group members of a certain class may share the communication costs between the teacher and any of the class students.

In another example, if the service subscriber and the recipient are members of a group of business conference participants, then the business conference group pricing plan may dictate that the conference organizers may cover a percentage of the charge for the telecommunication. In this way, during a conference, the conference organizers may cover a discount of a particular percentage for any calls between people participating in the conference, within the conference city.

In yet another example, if the service subscriber is a club manager of a fan club group and the recipient is a club member of the fan club group, or if the service subscriber and the recipient are members of the fan club group, then the fan club group pricing plan may dictate that members of the fan club may share the charge for the communication. In this way, the club manager may receive discounted SMS fees in order to update all club members with one or more daily bulk SMS messages. Also, the club manager may also accept charges for group members browsing the club web site.

Additionally, in another example, if the service subscriber is a vendor associated with a shopping club group and the recipient is a club member of the shopping club group, then the shopping club group pricing plan may dictate that members of the shopping club may share the charge for the communication. In yet another example, if the service subscriber is a club member of the shopping club group and the recipient is a vendor associated with the shopping club group, then the shopping club group pricing plan may dictate that the vendor may share the charge for the communication. In this way, the vendor may be able to present group members with coupons and incentives for new purchases, updating the group members about new collections and merchandise, using discounted SMS fees. Additionally, calls from club members to the vendor may be sponsored by the vendor.

In another embodiment, the billing group may include a private 1-800 number group. For example, the charge for any calls of the billing group members to a specific number (e.g., a 1-800 number, etc.) may be covered, subsidized, etc. by the owner of the billing group. Further, in one embodiment, a quota may be associated with the pricing plan that is associated with the billing group and may be used to process the charge. For example, the pricing plan may include a separate quota for each subscriber of the plan, after which additional services consumption may not be covered by the billing group. In another embodiment, the pricing plan may indicate a global quota for all members of the billing group that is consumed on a first come, first served basis.

In another embodiment, if the service subscriber and the recipient are both included in multiple billing groups, a pricing plan associated with one of the billing groups may be selected according to a predefined policy. For example, each pricing plan may have an assigned priority, and the pricing plan with the highest priority may be selected. In another example, the pricing plan with the lowest overall price may be selected. Of course, however, the pricing plan may be selected in any manner.

In this way, a billing group associated with the service subscriber and the recipient may pay for or subsidize telecommunication services of the billing group members, according to the group designation. This may create a payment paradigm that bases telecommunication charges on the concept of social groups and may support networking between group members, notification services, phone and money allowance for selected billing group members, and the delivery of coupons and other benefits to group members. Additionally, payment for telecommunications may be performed by entities that benefit from the telecommunication consumption, instead of the entities that consume the telecommunications.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
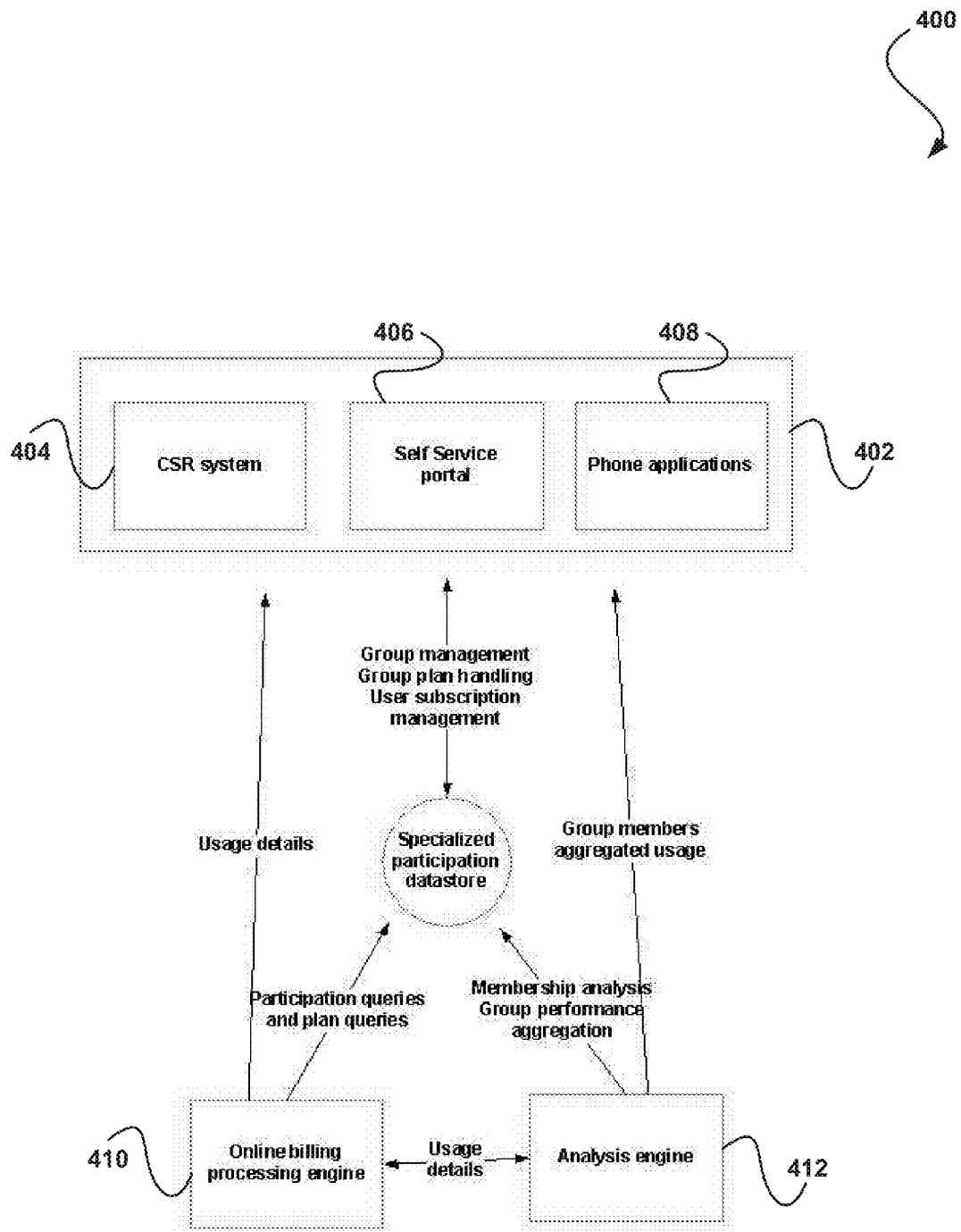
FIG. 4 illustrates an exemplary social billing payment architecture, in accordance with another embodiment.

FIG. 4 illustrates an exemplary social billing payment architecture 400, in accordance with another embodiment. As an option, the architecture 400 may be implemented in the context of the details of FIGS. 1-3. Of course, however, the architecture 400 may be implemented in any desired environment. Further, the aforementioned definitions may equally apply to the description below.

As shown, the architecture 400 includes front end components 402, which include a CSR system portal 404, a self-service portal 406, and phone applications 408. In one embodiment, the CSR system portal 404 and self-service portal 406 may allow simple presentation and manipulation of one or more of group creation, modification, and plans. In another embodiment, the self-service portal 406 may allow unique customers to control participation in one or more groups.

Additionally, in one embodiment, the phone applications 408 may include a small set of services that may allow the performance of basic tasks (e.g., subscribing to a group, removing a subscription, etc.), where such tasks may be performed directly from a phone of a consumer. Further the architecture 400 includes an online billing processing engine 410. In one embodiment, the online billing processing engine 410 may consider group participation. Further still, one or more data structures may be modified in order to support the online billing processing engine 410.

Also, the architecture 400 includes an analysis engine 412. In one embodiment, the analysis engine 412 may include payment and usage analysis tools that may allow the operator to examine the effectiveness of a specific group plan, and may also allow group administrators to control and modify their group plan and usage. In another embodiment, incoming communication requests may be handled by the billing processing engine 410.

Additionally, upon service rating request, the billing processing engine 410 may check the participation of the origin and target subscribers, and if they participate in shared groups, the billing processing engine 410 may compare the different pricing plans for the groups and may use it to rate the service. In another embodiment, if no common groups are found, the existing pricing method may be used. In this way, the internal representation of the payment architecture as well as its supporting tools may be changed in order to support the notion of groups within a billing structure.

Figure 5:
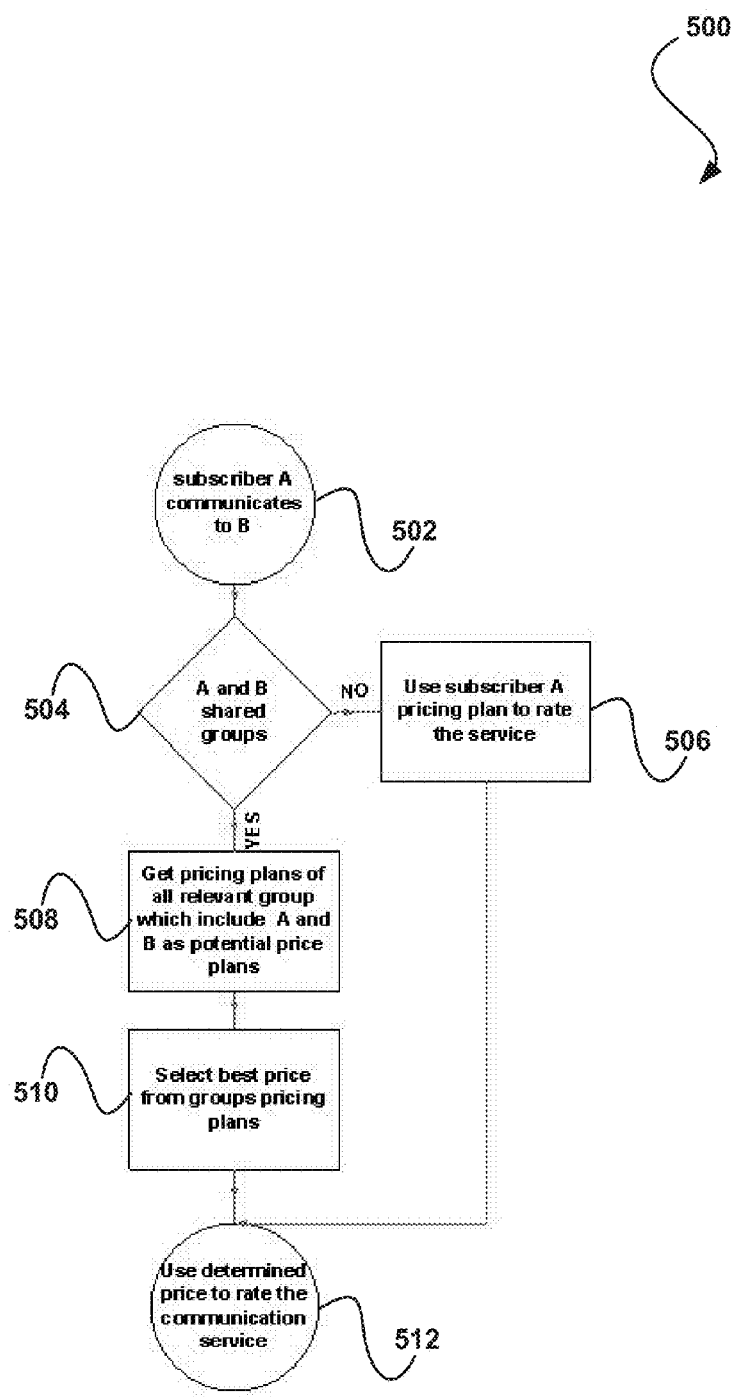
FIG. 5 illustrates a method for charge handling, in accordance with another embodiment.

FIG. 5 illustrates a method 500 for charge handling, in accordance with another embodiment. As an option, the method 500 may be implemented in the context of the details of FIGS. 1-4. Of course, however, the method 500 may be implemented in any desired environment. Further, the aforementioned definitions may equally apply to the description below.

As shown in operation 502, subscriber A communicates to user B. For example, subscriber A may call user B, may text user B, etc. In one embodiment, subscriber A may send a telecommunication to user B. In another embodiment, subscriber A may subscribe to one or more telecommunications services provided by a service provider. Additionally, as shown in decision 504, it is determined whether subscriber A and user B are included within any shared billing groups.

If it is determined in decision 504 that subscriber A and user B are not included within any shared billing groups, then in operation 506, a pricing plan associated with subscriber A is used to rate the communication service. In one embodiment, the pricing plan may be associated with the one or more telecommunications services provided by the service provider that are subscribed to by subscriber A. For example, the pricing plan may include a data service plan, a voice service plan, etc.

However, if it is determined in decision 504 that subscriber A and user B are included within one or more shared billing groups, then in operation 508, the pricing plans of all relevant user groups which include subscriber A and user B are retrieved as potential price plans. Additionally, as shown in operation 510, the best price is selected from all of the retrieved potential price plans. In one embodiment, the best price may be selected dynamically according to an algorithm. In another embodiment, the best price may be selected manually.

In yet another embodiment, the best price may include the lowest combined price for subscriber A and user B. Further, in another embodiment, the best price may include the price with the lowest cost for subscriber A. In yet another embodiment, the best price may include the price with the lowest cost for user B. Further still, as shown in operation 512, the selected best price is used to rate the communication service. In this way, the cost for the communication between subscriber A and user B may be minimized for both subscriber A and user B.

Also, in one embodiment, the user groups may be heterogeneous and may not share the same service provider. For example, the subscriber A and the user B may not share the same service provider. In another embodiment, a gateway with a toll-free number (e.g., a 1-800 number, etc.) for social billing calls may be defined for the service provider. For example, users from different service providers who want to make a call charged on a particular social billing group policy may call the social billing gateway number, and follow with dialing the destination number.

In another embodiment, the social billing gateway may evaluate the pricing plan of the call according to the common social billing group memberships of the caller and callee, and may charge the call to the appropriate social billing group account. In another embodiment, if no common social billing group memberships are found, the call may be disconnected. Additionally, the caller may be instructed to use a direct call instead.

Further, in another embodiment, using prepaid capabilities and mixing services between postpaid and prepaid, a call may be subsidized such that a subscriber may have a special prepaid account used only for social billing services. In yet another embodiment, any call from this user to the network operating social billing may be reconciled at a later date by using a standard replenishment application programming interface (API) such that a subsidy for the call may be refunded by the operator managing social billing groups. In still another embodiment, wholesale, interconnect, or roaming agreements may be used between service providers.

Further still, in one embodiment, a billing processing structure modification may be performed. For example, a new entity may be introduced into the hierarchy of entities within the data structure (e.g., named "social group," etc.). Additionally, the new entity may have a plan associated with it, an administrator, and a set of performance indicators describing the accumulated performance in the group. Further, the subscriber record may hold links to the groups it is a member in, where each link may keep records of the user participation dates within the group. Further still, each processed customer data record (CDR) may hold not only communication details but may also include the group and plan details which were applied to process the payment for that event.

In this way, consumers may participate in multiple groups simultaneously, where each group designation (and associated group payment plan) may define the services applicable for the payment shift. Additionally, this payment granularity may allow subsidies, split payments, quota based payments, and other payment types as an integral part of the infrastructure as may be required in billing of large operators. Further, a service may be provided that supports the aforementioned functions across vendors and channels. Further still, a platform may be created that may enable its customers to provide such services on their own.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for receiving a telecommunication from a service subscriber to a recipient;
    computer code for determining whether the service subscriber and the recipient are both included in a single billing group or are both included in a plurality of distinct billing groups;
    computer code for processing a charge for the telecommunication using a pricing plan associated with the single billing group upon determining that the service subscriber and the recipient are both included in the single billing group, where the pricing plan dictates entities responsible for the charge for the telecommunication, based on one or more criteria; and
    computer code for processing the charge for the telecommunication using the pricing plan selected according to a predefined policy upon determining that the service subscriber and the recipient are both included in each of a plurality of billing groups, where selecting the pricing plan includes:
        identifying a plurality of priorities each assigned to a unique billing group of the plurality of billing groups,
        selecting the pricing plan associated with the billing group having a highest priority when compared to the plurality of priorities, and
        processing the charge for the telecommunication, utilizing the selected pricing plan.

2. The computer program of claim 1, wherein the telecommunication is made from a mobile device.

3. The computer program of claim 1, wherein the billing group includes a group of subscribers with shared interests.

4. The computer program of claim 1, wherein the billing group is business oriented.

5. The computer program of claim 1, wherein at least one of the service subscriber and the recipient are included within a plurality of the billing groups simultaneously.

6. The computer program of claim 1, wherein when the service subscriber and the recipient are not included in a billing group, a pricing plan associated with the service subscriber is used to process the charge.

7. The computer program of claim 1, wherein when the service subscriber and the recipient are members of a group of business conference participants, then a business conference group pricing plan dictates that conference organizers cover a percentage of the charge for the telecommunication.

8. The computer program of claim 1, wherein a quota is associated with a pricing plan that is associated with the billing group and may be used to process the charge.

9. The computer program of claim 8, wherein the pricing plan includes a separate quota for each subscriber of the plan, after which additional services consumption are not covered by the billing group.

10. The computer program of claim 8, wherein the pricing plan indicates a global quota for all members of the billing group that is consumed on a first come, first served basis.

11. The computer program of claim 1, wherein each pricing plan has an assigned priority, and the pricing plan with the highest priority is selected.

12. The computer program of claim 1, wherein the pricing plan with the lowest overall price is selected.

13. The computer program of claim 1, wherein the telecommunication includes a telephone call.

14. The computer program of claim 1, wherein the telecommunication includes a data transmission.

15. The computer program of claim 1, wherein the service subscriber and the recipient do not share the same service provider, and the telecommunication from the service subscriber to the recipient is made using a gateway with a toll-free number defined for the service provider of one of the service subscriber and the recipient, such that the telecommunication is charged based on a billing group associated with the gateway.

16. The computer program of claim 15, wherein the determining and the processing are performed by the gateway.

17. A method, comprising:
    receiving a telecommunication from a service subscriber to a recipient;
        determining whether the service subscriber and the recipient are both included in a single billing group or are both included in a plurality of distinct billing groups;
        processing a charge for the telecommunication using a pricing plan associated with the single billing group upon determining that the service subscriber and the recipient are both included in the single billing group, where the pricing plan dictates entities responsible for the charge for the telecommunication, based on one or more criteria; and
    processing the charge for the telecommunication using the pricing plan selected according to a predefined policy upon determining that the service subscriber and the recipient are both included in each of a plurality of billing groups, where selecting the pricing plan includes:
        identifying a plurality of priorities each assigned to a unique billing group of the plurality of billing groups,
        selecting the pricing plan associated with the billing group having a highest priority when compared to the plurality of priorities, and
        processing the charge for the telecommunication, utilizing the selected pricing plan.

18. A system, comprising:
    a processor for:
    receiving a telecommunication from a service subscriber to a recipient;
    determining whether the service subscriber and the recipient are both included in a single billing group or are both included in a plurality of distinct billing groups;
    processing a charge for the telecommunication using a pricing plan associated with the single billing group upon determining that the service subscriber and the recipient are both included in the single billing group, where the pricing plan dictates entities responsible for the charge for the telecommunication, based on one or more criteria; and
    processing the charge for the telecommunication using the pricing plan selected according to a predefined policy upon determining that the service subscriber and the recipient are both included in each of a plurality of billing groups, where selecting the pricing plan includes:

identifying a plurality of priorities each assigned to a unique billing group of the plurality of billing groups, selecting the pricing plan associated with the billing group having a highest priority when compared to the plurality of priorities, and processing the charge for the telecommunication, utilizing the selected pricing plan.

19. The system of claim 18, wherein the processor is coupled to memory via a bus.

\* \* \* \* \*